United States Patent [19]
Holt et al.

[11] Patent Number: 6,105,080
[45] Date of Patent: Aug. 15, 2000

[54] HOST ADAPTER DMA CONTROLLER WITH AUTOMATED HOST REPLY CAPABILITY

[75] Inventors: Keith W. Holt; Bret S. Weber, both of Wichita, Kans.

[73] Assignee: LSI Logic Corporation, Milpitas, Calif.

[21] Appl. No.: 09/000,681

[22] Filed: Dec. 30, 1997

[51] Int. Cl.$^7$ .................................................. G06F 13/28
[52] U.S. Cl. ........................................................ 710/26
[58] Field of Search ............................. 710/22, 26, 126, 710/129

[56] References Cited

U.S. PATENT DOCUMENTS

| | | | |
|---|---|---|---|
| 5,542,053 | 7/1996 | Blaud et al. | 710/129 |
| 5,708,849 | 1/1998 | Coke et al. | 710/22 |
| 5,864,712 | 1/1999 | Carmichael et al. | 710/20 |

Primary Examiner—Glenn A. Auve

[57] ABSTRACT

A DMA controller operable within a host adapter which automatically transmits replies to an attached host system to thereby reduce overhead processing in the I/O processor of the host adapter. The DMA controller is preferably operable to perform DMA transfers in accordance with one or more scatter/gather lists descriptive of the desired data transfer. A flag bit associated with and/or contained in entries of the scatter/gather list signifies the need to transmit a reply message to the host system. The requisite reply message is transmitted to the host system by the DMA controller following the DMA transfer of the block defined by the scatter/gather list entry containing the indicator. The reply message content is determined in accordance with information associated with and/or contained in the subsequent entry of the scatter/gather list. The subsequent scatter/gather list entry includes a reference to the reply message content and a reference to the destination location to which the reply is transmitted. In the preferred embodiment, the host adapter is operable in accordance with the industry standard I2O specifications. A reply message is transmitted to the I2O compatible host system interface via I2O defined outbound queues and context structures defined in the subsequent scatter/gather list. In addition, the reply message may be either static and predefined or dynamically generated by the DMA controller. Further, the destination for the reply message may be either statically encoded in the scatter/gather list entry or may be dynamically obtained from the context structures by the DMA controller.

18 Claims, 4 Drawing Sheets

HOST ADAPTER DMA CONTROLLER WITH AUTOMATED HOST REPLY CAPABILITY

BACKGROUND OF THE INVENTION

1. Field of the Invention

The invention relates to host adapter or I/O interface devices and in particular to host adapters connected directly to a host system bus wherein the adapters use DMA controllers adapted to automatically transmit reply messages to requesting host system without intervention from the general purpose processor of the host adapter.

2. Discussion of Related Art

Host computing systems generally include a system bus in which I/O interface circuits are inserted to connect the host system to peripheral I/O devices. Such circuits are often referred to as host adapters, I/O interfaces, I/O processors (IOP) and other equivalent terms and acronyms. The current trend for high-end networking and storage technology pushes more functionality down to the low-level driver, while demanding higher performance. To meet these requirements, hardware vendors are turning to intelligent host adapters that contain their own I/O controller circuits and associated processing capability for processing I/O transactions. RAID controllers for storage and ATM controllers for networking are exemplary of such high performance intelligent host adapters. Intelligent host adapters may include significant local processing power and local memory used for processing of host I/O requests and for control of attached I/O devices. It is therefore known in the art to provide significant processing intelligence within host adapters.

The I2O standards have also become popular in the art as a standardized interconnection between a host system and associated intelligent adapters. The I2O standards are published and maintained by an industry group known as: I2O Special Interest Group; 404 Balboa Street; San Francisco, Calif. 94118, USA (also accessible through the World Wide Web at "http://www.I2Osig.org"). The I2O interface standards define layers of an interface structure between, for example, a host system and an intelligent host adapter. The layers are defined in a symmetric manner such that corresponding layers in each of two communicating nodes essentially communicate with one another via corresponding lower layers.

The standard serves to simplify driver modules by isolating device dependencies in the modules. Driver modules written in conformance with this standard are also more portable among a variety of system architectures. The I2O specification partitions the device driver into a first portion that contains all the OS-specific code and another portion for hardware-specific code unique to a particular class of I/O device. OS vendors need to produce only one OS-specific module for each class of I/O device. Likewise, hardware vendors have to produce only a single version of the hardware device module for an I/O adapter. The device driver can be split more than once, creating stackable drivers. This enables an independent software vendor to support system expansion, independent of both the hardware and the OS.

The corresponding lowest layers in an I2O host system and an I2O intelligent adapter communicate with one another via shared memory data structures. The shared memory is accessible via the common system bus interconnecting the communicating nodes (i.e., the host system and the intelligent adapter). Specifically, the I2O interface defines a number of standard queues and other data structures commonly accessible in memories shared between the respective processors of the host system and the intelligent adapters. The Peripheral Component Interconnect (PCI) bus has become a popular system bus for direct connection of such host adapters to the host system. In such system bus configurations the host system may directly access the local memory of the host adapter. In like manner the host adapter may directly access the memory of the host system. Using such direct access to one another's memory, it is common to use direct memory access (DMA) components in host adapters to perform the requisite transfers of data with minimal overhead imposed on the general purpose processing power of both the host system and the host adapter.

It is also generally known in the art to use scatter/gather DMA techniques to permit flexibility in the distribution of data to be exchanged between a source and destination in a DMA transfer. Such scatter/gather techniques enable a DMA to retrieve data for the transfer from non-contiguous memory locations in the source memory (gather) and/or to store the retrieved data in non-contiguous locations of the destination memory (scatter). As presently known in the art, scatter/gather DMA devices use at least one scatter/gather list that specifies to the DMA transfer circuits (DMA engine) a series of source blocks of data to be retrieved and a corresponding series of destination blocks into which the retrieved data is to be stored.

In general, a host adapter performs I/O operations with the attached I/O peripheral in response to receipt of an I/O request from the host system. Data is generally transferred between the host system memory and the local memory of the host adapter. For example, in processing a write request, the data to be written is transferred from the host system memory to the local memory of the host adapter (via DMA) and then on to the attached I/O device. In processing a read request, the requested data is retrieved or derived from the attached I/O device into the local memory of the host adapter and then transferred from the host adapter local memory to the host system memory (again, via DMA).

In processing of a host I/O request, the host adapter generally constructs a scatter/gather DMA block list to define the entire transfer required between the adapter's local memory and the host system's memory. At completion of processing of the specified scatter/gather list(s) the host adapter's processor is interrupted to complete the I2O specific transaction. For example, the host system may require a response from the I2O compatible host adapter to indicate that the requested transfer is complete and the status of the completion.

As is presently known in the art, the DMA transfer is terminated (completed) at any point in the exchange which may require a response from the adapter to the host system. This completion of the desired transfer is indicated to the processor of the adapter by the DMA completion (e.g., completion interrupt from the DMA controller to the processor). The host adapter's processor then performs requisite data exchanges to generate the required response and to transfer the response to the host system through the I2O interface.

Such a pause or stoppage of a DMA transfer to generate a response and the processor time required for the general purpose processor to construct a desired response can negatively impact overall performance of the storage subsystem. Overall system performance would be enhanced if the processor need not intervene in the DMA transfer or even participate in the generation and transmission of a I2O response. In particular, since a large percentage of DMA operations are completed normally (i.e., without error), normal replies for such normal completions are responsible for the vast majority of such processing overhead within a host adapter.

It can be seen from the above discussion that a need exists for an improved architecture for host adapters to perform DMA operations which are integrated with response generation and transmission.

SUMMARY OF THE INVENTION

The present invention solves the above and other problems, thereby advancing the state of the useful arts, by providing a DMA design which integrates DMA transfers, as controlled by a scatter/gather list, with response transmission. The DMA controller of the present invention defines special markers (also referred to as flags or flag bits) associated with a DMA scatter/gather list which define a response to be transmitted to the requesting host system. As the DMA controller processes source and destination memory blocks defined by one or more scatter/gather lists, it monitors for the presence of such a marker flag signifying the need to transmit a response to the attached host system. When such a flag is sensed, the DMA next fetches information associated with the scatter/gather list required to send the desired response. The desired response is fetched and/or constructed and transmitted to the attached host system. The DMA controller then continues with any remaining portions of the DMA transfer defined by the scatter/gather list.

The flag and other information for initiating the response may be integrated with the scatter/gather list elements or may be in an associated structure that provides "meta-data" regarding the scatter/gather list or lists. The DMA controller of the present invention is particularly useful in I2O host adapter environments but may be similarly applied to other intelligent I/O host adapter architectures. Further, the DMA controller of the present invention is particularly useful as applied to storage or network communication host adapter applications and still more particularly to RAID storage controllers and Fibre Channel communication host adapters.

The present invention provides for an optional reply flag associated with entries of the scatter/gather lists associated with the DMA transfer operation. The optional flag may be set in association with either a source block entry of the scatter/gather list or in a destination block entry of the scatter/gather list (or both). Where a single scatter/gather list is used by the DMA controller in which source and destination blocks are defined in matched pairs (typically of equal size), the reply flag may be set in association with any such entry to cause a corresponding reply to be generated and sent at that point in the DMA transfer. Where separate source and destination scatter/gather lists are provided to the DMA controller, the reply flag may be present in association with either a source list entry or a destination list entry (or both).

Preferably, a separate "end of list" flag is provided to indicate the end of the corresponding list and hence the end of the particular DMA transfer. The reply marker flag is therefore independent of the end of transfer flag/indication permitting a reply to be sent within a DMA transfer sequence as well as at the end of a transfer sequence. In particular, multiple such replies may be generated as required within a single DMA transfer sequence.

In application with an I2O compatible adapter, it may be preferable that the scatter/gather list format be compatible with the I2O specifications such that the DMA controller may directly utilize existing scatter/gather list formats. In such cases, it is preferred that the reply flag of the present invention be stored and retrieved in a structure external to, but associated with, the scatter/gather list(s). As used herein, the reply flag is referred to as being in the scatter/gather list regardless of where it is physically stored (i.e., whether physically stored in the scatter/gather list entries or in a meta-structure associated with the scatter/gather lists).

If the reply marker flag is set in a scatter/gather list entry, the DMA controller next fetches a source address corresponding to a previously generated I2O response (reply message) and a destination address corresponding to the I2O message frame address (MFA) of the reply from the MFA reply queue. The response is then written to the corresponding MFA in accordance with the I2O standards and the MFA is posted to the Outbound post queue in accordance with the I2O specifications. In accordance with the I2O specification, writing the MFA to the Outbound post queue causes an interrupt at the host system to notify it that the reply is available. Lastly, the DMA interrupts the processor of the host adapter to perform any further processing required. At least one host adapter processor interrupt is eliminated by the methods and apparatus of the present invention in that the processor need not be interrupted to intervene between the end of a DMA transmission and the generation and transmission of a required reply.

An alternative embodiment of the present invention permits the DMA controller to automatically obtain the proper MFA from the Outbound free queue as defined by the I2O specifications. Further, the reply message may be generated dynamically within the DMA controller based upon parameters provided in a buffer referenced by the source address of the reply entry of the scatter/gather list entry following the reply flag.

As can be seen from the above discussion, the present invention largely obviates the processing previously performed by the processor of the host adapter to generate and transmit an I2O reply during or following a DMA transfer. Rather, the present invention provides for a DMA controller which automates the process of generating and transmitting an I2O reply to a requesting host system.

It is therefore an object of the present invention to provide a DMA architecture useful in a host adapter which transmits reply messages to a host system without intervention by the processor of the host adapter.

It is a further object of the present invention to provide a DMA controller and methods of operating same useful in a host adapter which transmits I2O reply messages to a host system without intervention by the processor of the host adapter.

It is still a further object of the present invention to provide a DMA controller and methods of operating same in a host adapter which automatically transmits pre-built I2O reply messages to attached host systems.

It is yet a further object of the present invention to provide a DMA controller and methods of operating same in a host adapter which dynamically builds an I2O reply message and automatically transmits the I2O reply messages so built to attached host systems.

It is another object of the present invention to provide a DMA controller and methods of operating same in a host adapter which automatically transmits pre-built I2O reply messages to attached host systems and which dynamically determines the MFA to which the message is to be stored for transmission to the host system.

It is still another object of the present invention to provide a DMA controller and methods of operating same in a host adapter which dynamically builds an I2O reply message and automatically transmits the I2O reply messages so built to attached host systems and which dynamically determines the MFA to which the message is to be stored for transmission to the host system.

The above and other objects, aspects, features, and advantages of the present invention will become apparent from the following description and the attached drawings.

DETAILED DESCRIPTION OF THE PREFERRED EMBODIMENTS

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

Figure 1:
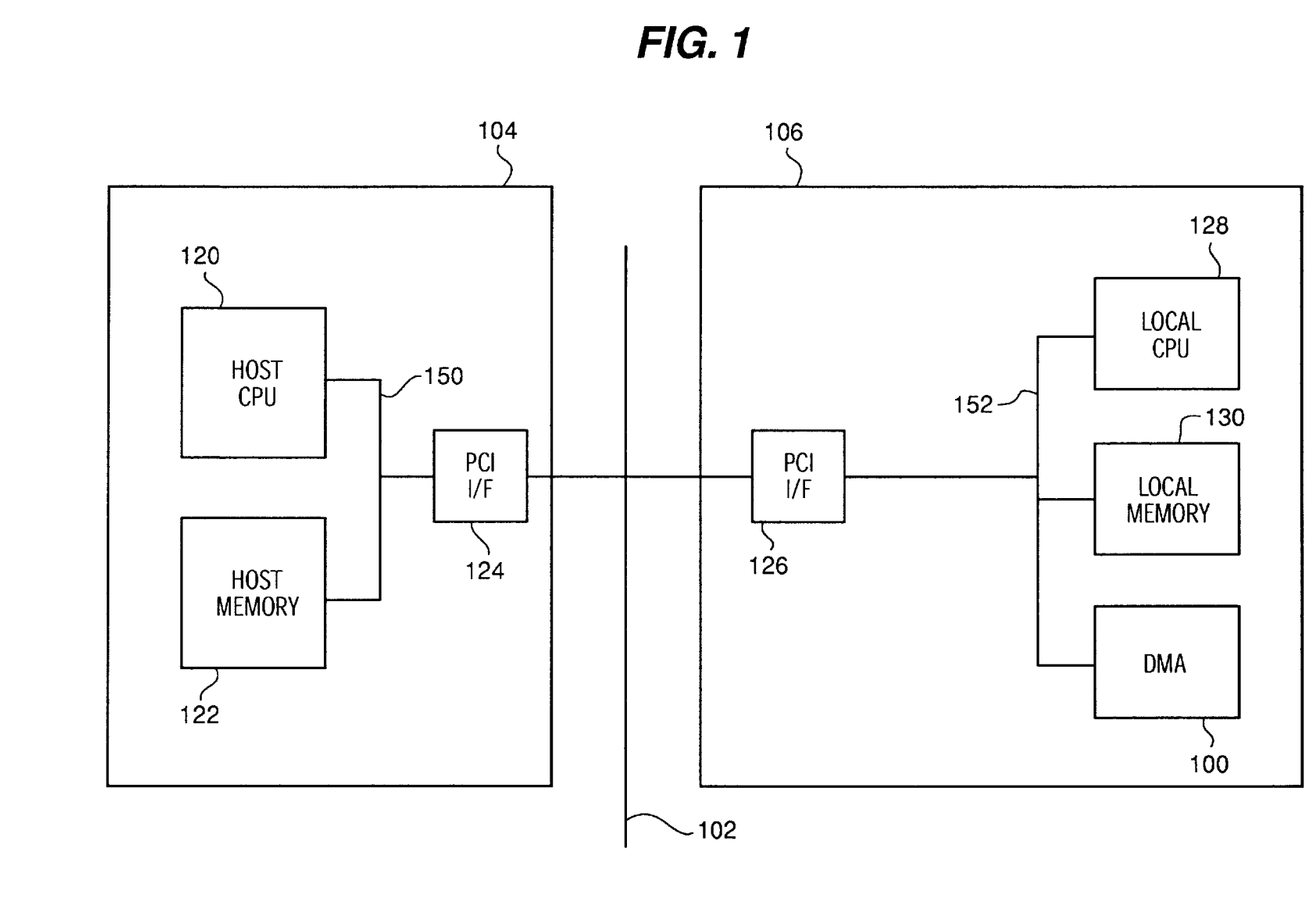
FIG. 1 is a block diagram of a typical host adapter environment in which the DMA controller of the present invention may be advantageously applied.

FIG. 1 is a block diagram depicting a typical host system 104 connected to a host adapter 106 in which the DMA controller 100 of the present invention may be advantageously applied. In particular, host system 104 and host adapter 106 are connected via a common peripheral interface bus 102. In general, host adapter 106 processes I/O requests received from host system 104 via common bus 102. Host adapter 106 may be connected to external I/O peripheral devices (not shown) on which I/O operations are performed for the benefit of, and at the request of, host system 104. Host adapter 106 of FIG. 1 is intelligent in that it possesses significant local processing power to perform I/O processing with a minimum of overhead imposed on the host system 104. Such intelligent host adapters are often utilized for host interconnection to high performance storage subsystems or networks (as well as other application apparent to those skilled in the art). As noted above, bus 102 is preferably a PCI compatible bus. However, those skilled in the art will recognize that any of several interface busses may be utilized in conjunction with the DMA controller and associated methods of the present invention.

Exemplary host system 104 further comprises a host CPU 120 and host memory 122 (as well as myriad other components not shown) connected via internal bus 150. PCI interface 124 serves to connect the devices on internal bus 150 to the PCI bus 102. Those skilled in the art will recognize that internal bus 150 (also commonly referred to as the processor bus) may be any of several standard busses depending upon the choice of components for host CPU 120. PCI interface 124 is typically a chip set selected to adapt the selected processor bus (150) to the PCI bus 124. Those skilled in the art will recognize a wide variety of such processor/PCI interface design choices.

Host adapter 106 shares the basic architectural design of host system 104 in that it comprises a local CPU 128 and local memory 130 connected via internal bus 152 (specific to the processor selected as local CPU 128). Devices on internal bus 152 are connected to CPI bus 102 via PCI interface 126.

As is known in the art of DMA controllers, scatter/gather lists are useful to describe a desired DMA transaction. Such a scatter/gather list defines the source and destination for a list of blocks which, together, comprise DMA transaction. DMA 100 in host adapter 106 is a DMA controller in accordance with the present invention which is adapted to perform the exchange of information between local memory 130 and host memory 122. DMA 100 uses at least one scatter/gather list to direct the processing of the desired DMA transaction. DMA 100 accesses local memory 130 via internal bus 152 and accesses host memory 122 indirectly via PCI bus 102.

For example, in processing a write I/O request, DMA 100 retrieves information from host memory 122 and moves it to local memory 130 for further processing within host adapter 106. More particularly, local memory 130 may be a cache memory in a host adapter 106 used for storage subsystem management (e.g., RAID storage subsystem management). The data to be written may be stored in host memory 122 in non-contiguous blocks. These locations are made known to host adapter 106 via a scatter/gather list provided by host system 104. In like manner, the locations in local memory 130 to which the blocks are to written may be non-contiguous (scattered throughout the memory). Read operations operate in a similar manner but in reverse. Specifically, a host system 104 read I/O request will request retrieval of particular blocks or types of data. In the case of a storage subsystem host adapter 106, the requested data, if not already present, is retrieved from the storage devices (not shown) and temporarily saved in local memory 130 (i.e., cache memory). The retrieved data may be scattered about within local memory 130. The locations in host memory 122 to which the retrieved data is to be transferred may likewise be non-contiguous. These locations are made known to host adapter 106 via a scatter/gather list provided by host system 104.

The scattered locations within local memory 130 are known to DMA 100 via a scatter/gather list constructed within host adapter 106 by CPU 128.

DMA 100 is operable to exchange the requested data between local memory 130 of host adapter 106 and host memory 122. As is previously known in the art, CPU 128 may construct a composite scatter/gather list which joins the two supplied scatter/gather lists. However, so joining the scatter/lists requires processing overhead within host adapter 106. In particular, as is taught in the art, such a composite list is built such that each entry includes a source location, a corresponding destination location, and a block size corresponding to both. Since the scattered block in host memory 122 and local memory 130 may not be of equal size, CPU 128 must construct the composite list so as to define portions of source and destination blocks having equal sizes.

Figure 2:
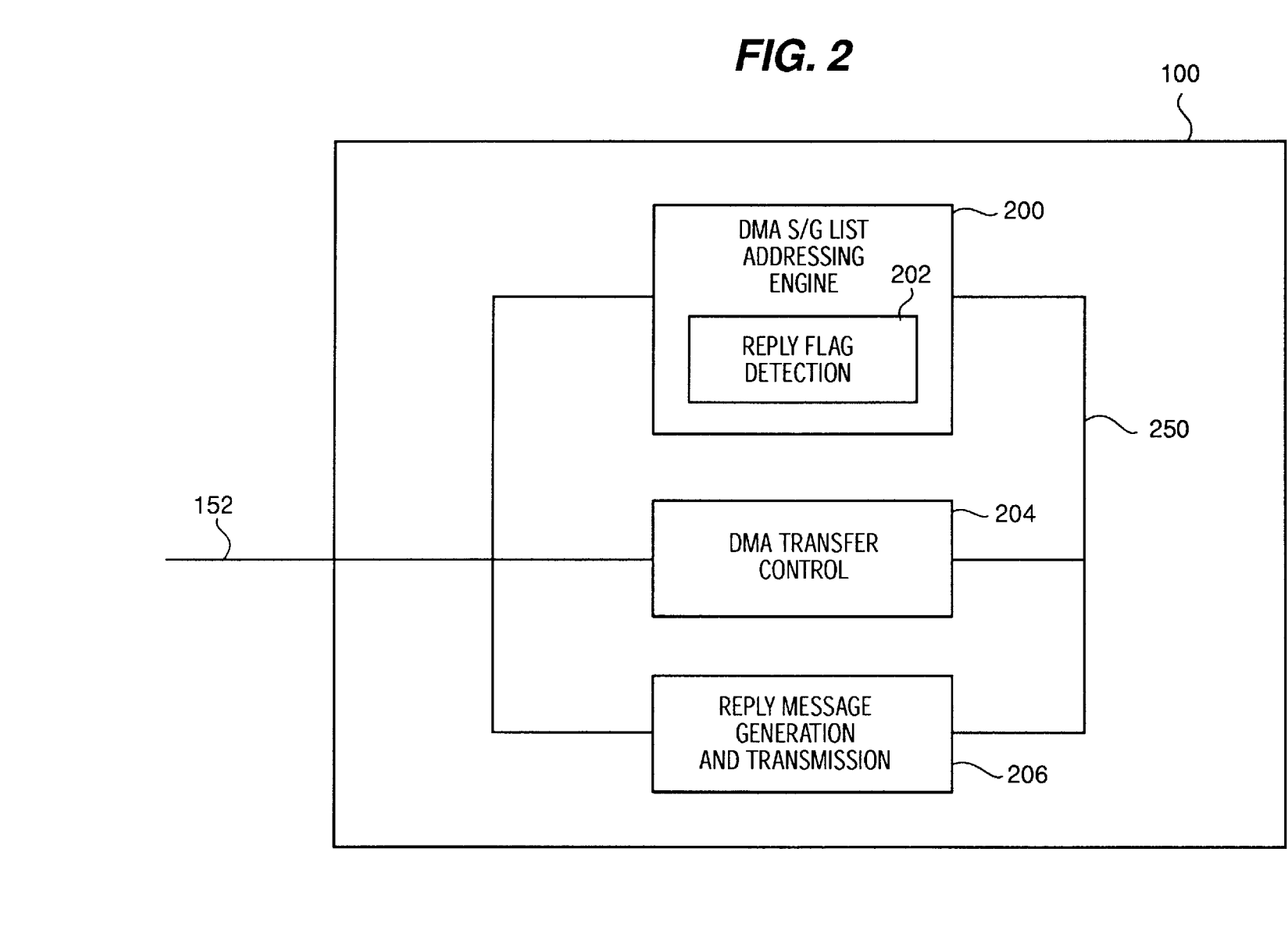
FIG. 2 is a block diagram of the DMA controller of the present invention.

FIG. 2 is a block diagram of the DMA controller 100 of the present invention. DMA controller 100 includes at least one DMA addressing engine 200. As is known in the art, DMA addressing engine 200 processes information in a scatter/gather list (also referred to herein as an S/G list) to generate source and destination addresses for DMA data transfers from the source locations to the destination locations. Control register values within DMA addressing engine 200 control the generation of addresses for the source of a DMA transfer and the destination of the DMA transfer. Counter values within such control registers determine when a boundary for a source or destination block is reached. In general use of a S/G list to define the blocks of a DMA data transfer is well known in the art. As described in co-pending U.S. patent application Ser. No. 09/000,822, hereby incorporated by reference, multiple DMA addressing engines may be used in a DMA controller (i.e., one for the source address generation and one for the destination address generation). Addresses generated by DMA addressing engine 200 are applied to processor bus 152 at the appropriate times to cause the desired source to destination data transfer. DMA transfer control 204 oversees the DMA data transfers and controls the timing of generation of source and destination addresses by DMA addressing engine 200. Reply message transmission 206 is operable in conjunction with DMA transfer control 204 and DMA addressing engine 200 to transmit pre-built I2O reply messages to an attached host system via processor bus 152 (and thence via PCI bus 102 of FIG. 1). DMA addressing engine 200, DMA transfer control 204, and reply transmission 206 communicate via internal bus 250 of DMA controller 100.

As noted herein, a reply message may be dynamically built (by processing in element 206) from parametric information supplied in association with the reply flag and the scatter/gather list entries.

Reply flag detection 202 monitors the S/G list entries as retrieved by DMA addressing engine 200 to determine whether the reply flag is set within the entry. When set, the reply flag (e.g., a bit within the S/G list entry) indicates that a reply is to be sent to the requesting host system following completion of the transfer of the corresponding source blocks to the associated destination. Reply flag detection 202 therefore tests the reply flag in each S/G list entry in response to completion of the transfer defined by that entry. It is common that the reply would be transferred at the completion of all entries in a S/G list. However, the apparatus and methods of the present invention permit the reply flag to be set independent of any end of transfer indicators. Replies may therefore be constructed and transmitted to a host system at any point within a sequence of DMA block transfers.

As noted further below, in the preferred embodiment, the reply message to be sent is pre-built by the processor of the host adapter which uses the DMA controller 100. The next entry in the S/G list following an entry having the reply bit set therefore includes a reference (e.g., pointer in memory or other identification means) to a pre-built reply message. This reference is preferably stored within the source address field of the next S/G list entry. Further, the destination address field within the next entry following the entry having a reply flag set defines the address to which the pre-built reply message is to be sent. Those skilled in the art will recognize that the reply message reference information, like the reply flag itself, could be stored in meta-structures associated with the scatter/gather list(s) rather than physically within the scatter/gather list(s). Where the DMA of the present invention is utilized with an I2O compatible host, it may be preferred that the reply flag and reference information be stored other than physically in the scatter/gather list. The I2O standards prescribe certain format standards for scatter/gather list. In storing the reply information elsewhere, the DMA of the present invention may be capable of directly utilizing the scatter/gather list format defined by the I2O standard.

In the preferred embodiment of the present invention, the host adapter in which DMA controller 100 is operable is an I2O compatible adapter connected to an I2O compatible host system. Though not a requisite of the present invention, the I2O environment standards are well suited to exchange of requests, data, and replies via memory mapped locations accessible to DMA controller 100. The destination address field for the reply therefore identifies a message frame address (MFA) pulled from the Outbound free queue defined by the I2O standards and used for reply transmission. As known in the art, the I2O standards automatically inform the host of the newly available reply message.

As noted further below, in an alternative embodiment, the MFA could be derived dynamically by DMA controller 100 of the present invention by appropriate manipulations and queries of the Outbound free queue. Further, in an alternative embodiment, the reply message may be constructed dynamically from parametric information supplied in (referenced by) the source address field of the next entry following the entry having a reply flag set.

Figure 3:
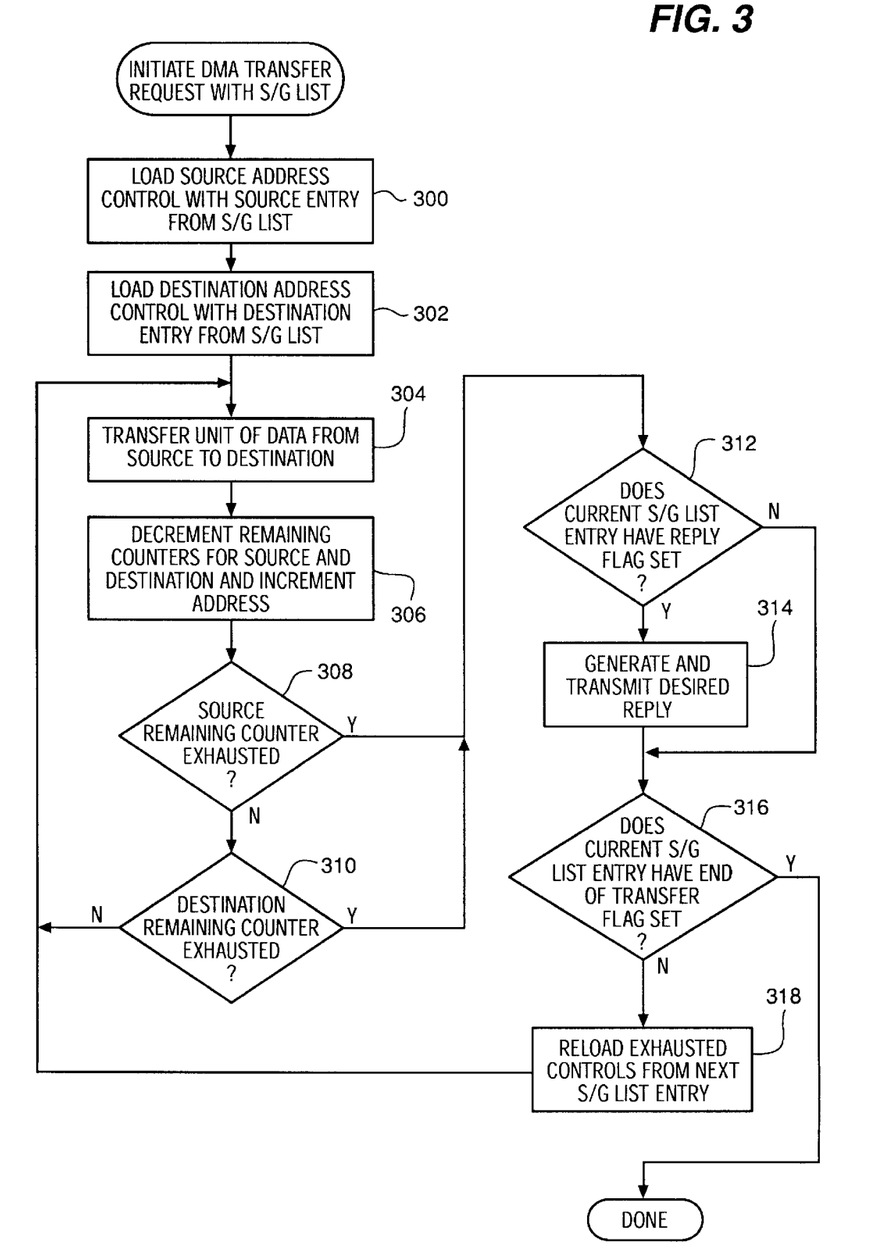
FIG. 3 is a flowchart describing the operation of the DMA controller of FIG. 2.

FIG. 3 is a flowchart describing the operation of DMA 100 of the present invention. The method described by FIG. 3 is initiated in response to commencement of a DMA transfer in accordance with a S/G list supplied to DMA 100. Element 300 is first operable to load source address control values within DMA addressing engine 200 (of FIG. 2) from the source address fields of the first entry of the supplied S/G list. Element 302 similarly loads destination address control values from the destination fields of the first S/G list entry. As is well known in the art, such control values include a start address of a block and the length of the block. The address is typically loaded into a register or other storage and incremented as each unit of data is transferred. The length value is typically loaded into a register or other storage and decremented as each unit of data is transferred.

As discussed in co-pending U.S. patent application Ser. No. 09/000,822, a plurality of DMA addressing engines may be operable in a DMA controller, for example, one each on a separate source block S/G list and on a separate destination block S/G list. Elements 300 and 302 are therefore representative of processing required to initialize one or more DMA addressing engines (e.g., 200 of FIG. 2) to commence DMA data transfers.

Element 304 is next operable to transfer a unit of data from the source to the destination in accordance with the present address in the DMA addressing engine address control values. DMA transfer control 204 (of FIG. 2) controls timing of the transfer with respect to processor bus 152 (of FIG. 2) as is known in the art. Element 306 is next operable to decrement the source and destination counter values and to increment the source and destination address values, as known in the art.

Elements 308 and 310 are operable to test whether either the source counter value or the destination counter value has been decremented to zero (exhausting the transfer with respect to the identified block. As noted elsewhere, where a single DMA addressing engine is used on a composite S/G list, it is common that both counters would be exhausted at the same time or that only a single counter is used since the blocks are defined as equal in size. Where, as in co-pending patent application Ser. No. 09/000,822, multiple DMA addressing engines are independently operating on separate S/G lists, each counter may be exhausted independent of the other.

If neither counter value is exhausted as determined by operation of elements 308 and 310, processing continues by looping back to element 304 to continue the requested DMA block transfer. If either counter value is exhausted, processing continues with element 312. Elements 312 and 314 are operable to perform the processing unique to the present invention whereby a reply message is optionally and automatically sent to the host system by operation of the DMA controller 100. If element 312 determines that the reply flag is set in the S/G list entry just exhausted, processing continues with element 314, else processing continues with element 316. Element 314 is operable to transmit a pre-built reply message in accordance with the next entry in the S/G list. Element 316 is then operable following operation of element 314.

As noted above, the S/G list entry following the entry with the reply bit set provides parameters required to generate an appropriate reply and to transmit that reply to the host system. In general, the source address portion of the entry is a reference to the reply message while the destination address field is a reference to a location to which the message is to be transmitted.

More specifically, in the preferred embodiment, the source address field is a pointer to a previously built reply message (typically pre-built when the S/G list was constructed by the processor of the host adapter to perform the DMA transfer). The destination address field is preferably a pointer to an MFA (in an I2O compatible host adapter) into which the pre-built reply message is copied. As noted herein, in alternative embodiments, the source address may reference parametric information used to dynamically construct a desired reply message and the destination address may be information used to derive the MFA from manipulation of the I2O Outbound free queue.

Element 316 is then operable to determine if the just exhausted S/G list entry has an end of transfer flag set. If so, the method is complete and the DMA transfer is finished. If not, processing continue with element 318 to reload the exhausted control values (e.g., source and/or destination address and counts values) from a next S/G list entry. Processing then continues with element 304 to continue the DMA transfer operation.

As noted elsewhere herein, the method of FIG. 3 is operable to transmit reply messages to an attached host system during a DMA transfer sequence as well as at the end of a sequence of S/G list entries.

Figure 4:
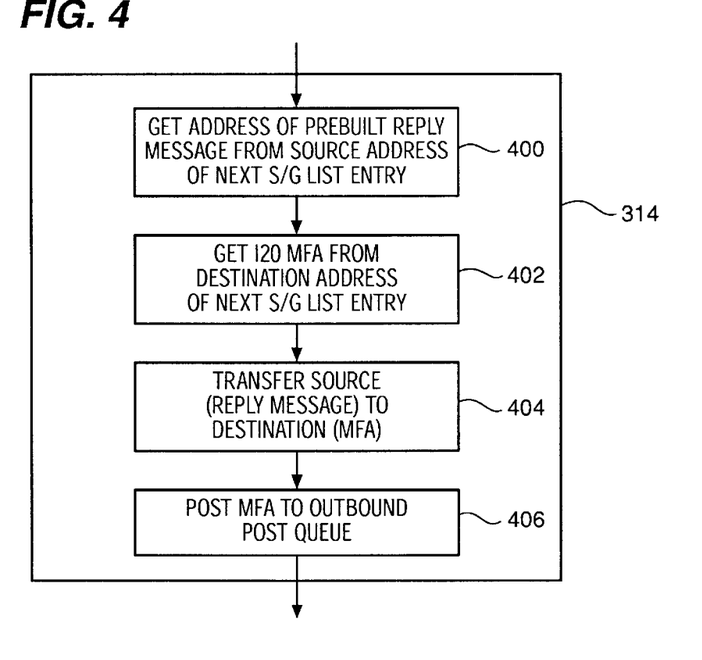
FIG. 4 is a flowchart describing additional detail of the flowchart of FIG. 3.

FIG. 4 is a flowchart describing the operation of element 314 of FIG. 3 in additional detail with respect to the preferred embodiment. As noted elsewhere herein, the preferred embodiment provides for use of the DMA controller of the present invention in an I2O compliant host adapter. FIG. 4 therefore describes the steps necessary to transmit a pre-built reply message to an I2O compatible requesting host system. Element 400 is first operable to get the address of the pre-built reply message from the source address field of the reply S/G list entry (the entry following an entry having the reply flag set). The pre-built message contains the reply message required for transmission to the host system and is preferably built at the time of constructing the S/G list for the DMA transfer.

Element 402 is next operable to retrieve the I2O MFA value from the destination field of the reply S/G list entry. The MFA address is previously retrieved from the I2O Outbound free queue, preferably at time of construction of the S/G list for the DMA transfer. Element 404 then transfers the pre-built reply message to the MFA using DMA transfer controls in a manner analogous to a DMA data transfer as described herein. Upon successful transfer of the reply message to the MFA, the MFA is placed in the Outbound post queue by operation of element 406 to inform the host system of the availability of the reply message. Placing the MFA in the Outbound post queue interrupts the host system and permits the host to retrieve the reply message.

Figure 5:
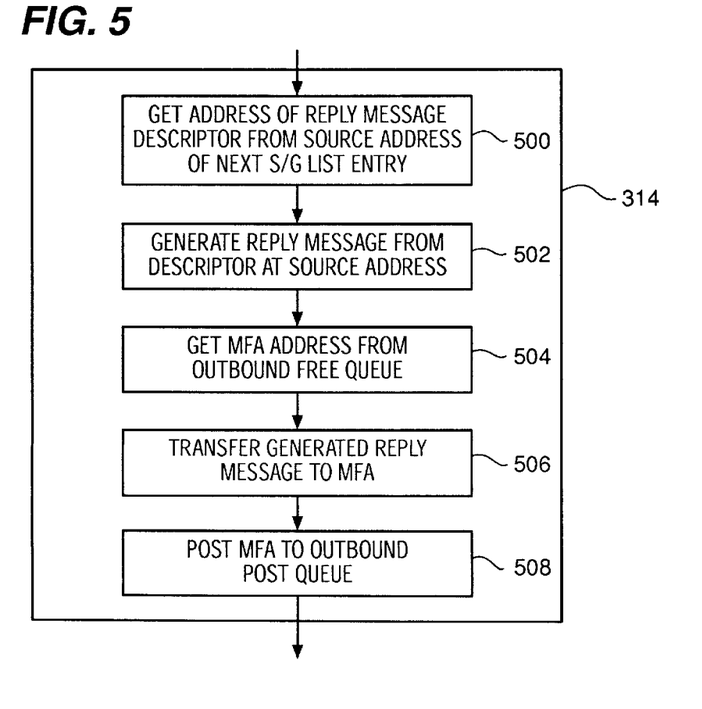
FIG. 5 is a flowchart describing additional detail of an alternative embodiment of the flowchart shown in FIG. 3.

FIG. 5 is a flowchart describing the operation of element 314 of FIG. 3 in additional detail with respect to an alternative embodiment. As noted elsewhere herein, this alternative embodiment also provides for use of the DMA controller of the present invention in an I2O compliant host adapter. FIG. 5 therefore describes the steps necessary to transmit a dynamically built reply message to an I2O compatible requesting host system including dynamic determination of the proper MFA. Element 500 is first operable to get the reference to reply message parameters from the source address field of the reply S/G list entry (the entry following an entry having the reply flag set). These parameters include all information required to dynamically generate a reply message including static portions of such a message and parameter values to be substituted into variable portions of the reply message. Element 502 is next operable to perform processing required to generate the complete reply message from the parametric information retrieved by operation of element 500.

Element 504 is next operable to retrieve the next available I2O MFA value from the I2O Outbound free queue. DMA controller 100 (specifically reply message transmission 206 of FIG. 2) would manipulate the Outbound free queue in accordance with the I2O specifications to obtain a next available MFA therefrom. Element 506 then transfers the dynamically built reply message to the MFA using DMA transfer controls in a manner analogous to a DMA data transfer as described herein. Upon successful transfer of the reply message to the MFA, the MFA is placed in the Outbound post queue by operation of element 508 to inform the host system of the availability of the reply message. Placing the MFA in the Outbound post queue interrupts the host system and permits the host to retrieve the reply message.

While the invention has been illustrated and described in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A DMA controller operable in a host adapter comprising:

a DMA addressing engine for processing a DMA request in accordance with a scatter/gather list;

detection means associated with said DMA addressing engine for sensing indicia associated with said scatter/gather list indicative of the need to transmit a reply to an attached host system;

reply transmission means, responsive to said detection means, for transmitting a reply to said host system in response to detection of said indicia indicative of the need to transmit said reply; and means for continuing operation of said DMA controller for further processing in accordance with further entries in said scatter/gather list following transmission of said reply wherein said DMA controller continues operation without further intervention from a host system.

2. The DMA controller of claim 1 wherein said indicia includes:

a flag bit associated with a DMA block transfer preceding transmission of said reply.

3. The DMA controller of claim 2 wherein said indicia further includes:

a reference to a reply message to be transferred to said host system.

4. The DMA controller of claim 3 wherein said reply message is pre-built by said host adapter.

5. The DMA controller of claim 3 further comprising:

reply generation means, responsive to said detection means, to generate said reply message in response to detection of said flag bit.

6. The DMA controller of claim 1 wherein said host adapter is an I2O compatible host adapter.

7. The DMA controller of claim 6 wherein said indicia includes:

a reference to a location to which said reply message is transmitted by said reply transmission means.

8. The DMA controller of claim 7 wherein said reference to a location is an I2O message frame address.

9. The DMA controller of claim 8 wherein said I2O message frame is derived by said DMA controller from an I2O Outbound free queue.

10. A method, operable within a DMA controller of a host adapter comprising the steps of:

performing a DMA transfer in accordance with a scatter/gather list;

detecting indicia associated with said scatter/gather list indicative of a need to transmit a reply message to an attached host system;

transmitting said reply message, via said DMA controller, to said host system; and continuing operation of said DMA controller for further processing in accordance with further entries in said scatter/gather list following transmission of said reply wherein said DMA controller continues operation without further intervention from a host system.

11. The method of claim 10 wherein said indicia includes:

a flag bit associated with a DMA block transfer preceding transmission of said reply.

12. The method of claim 11 wherein said indicia further includes:

a reference to a reply message to be transferred to said host system.

13. The method of claim 12 wherein said reply message is pre-built by said host adapter.

14. The method of claim 12 further comprising:

generating, in response to detecting said indicia, said reply message in response to detection of said flag bit.

15. The method of claim 10 wherein said host adapter is an I2O compatible host adapter.

16. The method of claim 15 wherein said indicia includes:

a reference to a location to which said reply message is transmitted.

17. The method of claim 16 wherein said reference to a location is an I2O message frame address.

18. The method of claim 17 wherein said I2O message frame is derived by said DMA controller from an I2O Outbound free queue.

* * * * *